United States Patent
Tsunashima

(10) Patent No.: US 11,161,669 B2
(45) Date of Patent: Nov. 2, 2021

(54) PACKAGING APPARATUS AND INNER BOX THEREOF

(71) Applicant: Brother Kogyo Kabushiki Kaisha, Nagoya (JP)

(72) Inventor: Ryunosuke Tsunashima, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 65 days.

(21) Appl. No.: 16/819,727

(22) Filed: Mar. 16, 2020

(65) Prior Publication Data
US 2020/0307890 A1  Oct. 1, 2020

(30) Foreign Application Priority Data
Mar. 28, 2019  (JP) .............................. JP2019-062396

(51) Int. Cl.
*B65D 81/05* (2006.01)
*B65D 5/50* (2006.01)

(52) U.S. Cl.
CPC ......... *B65D 81/058* (2013.01); *B65D 5/5047* (2013.01); *B65D 2581/053* (2013.01); *B65D 2581/058* (2013.01)

(58) Field of Classification Search
CPC ............... B65D 81/058; B65D 5/5047; B65D 2581/053; B65D 2581/058
USPC .......................... 206/320, 591, 592, 593, 594
See application file for complete search history.

(56) References Cited

U.S. PATENT DOCUMENTS

| 2011/0056867 | A1* | 3/2011 | Ohsawa | B65D 81/056 206/586 |
| 2012/0043249 | A1* | 2/2012 | Tsukii | B65D 5/504 206/521 |
| 2012/0097569 | A1* | 4/2012 | Murano | B65D 77/04 206/523 |
| 2014/0319011 | A1* | 10/2014 | Noguchi | B65D 5/42 206/521 |
| 2015/0114870 | A1* | 4/2015 | Fujino | B65D 43/162 206/503 |

FOREIGN PATENT DOCUMENTS

JP  2014-223920 A  12/2014

* cited by examiner

*Primary Examiner* — Jacob K Ackun
(74) *Attorney, Agent, or Firm* — Banner & Witcoff, Ltd.

(57) ABSTRACT

A packaging apparatus includes: an inner box of which upper side is open and capable of storing a first object; an outer box capable of storing a second object and the inner box disposed on the second object, and having a pair of inner flaps and a pair of outer flaps; a protective portion formed in the inner box to protect the first object, the protective portion being disposed between the first object and a portion that is included in a facing portion of the pair of outer flaps and that does not overlap with the pair of inner flaps in a state where the pair of inner flaps and the pair of outer flaps are closed; and a pressing portion formed in at least any one of the inner box and the outer box to press the first object toward a bottom surface of the inner box.

7 Claims, 10 Drawing Sheets

Fig. 1
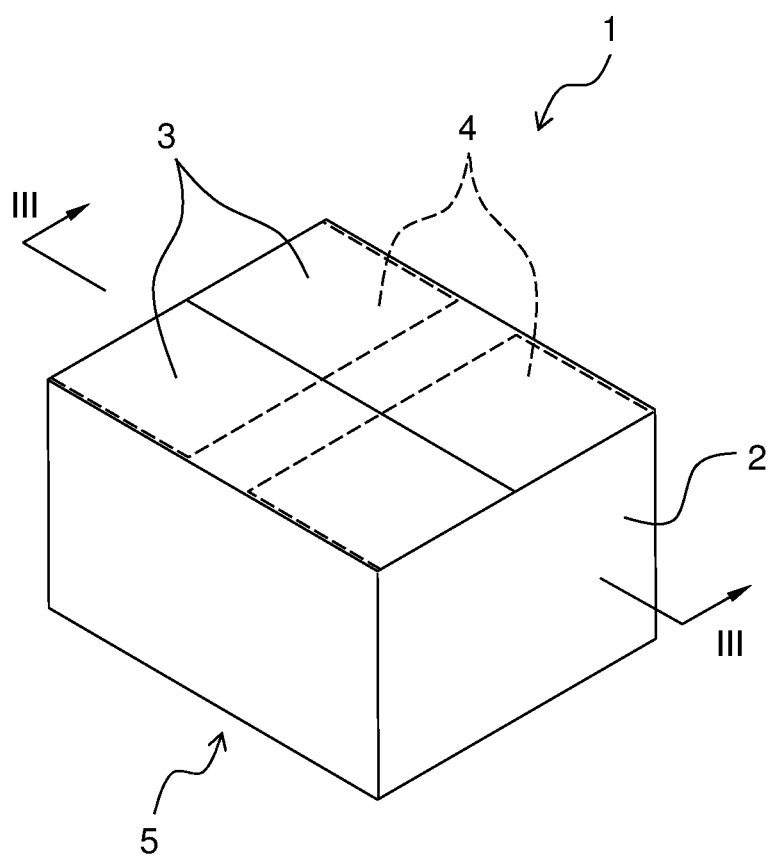
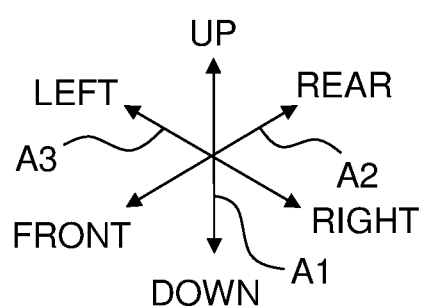

Fig. 2
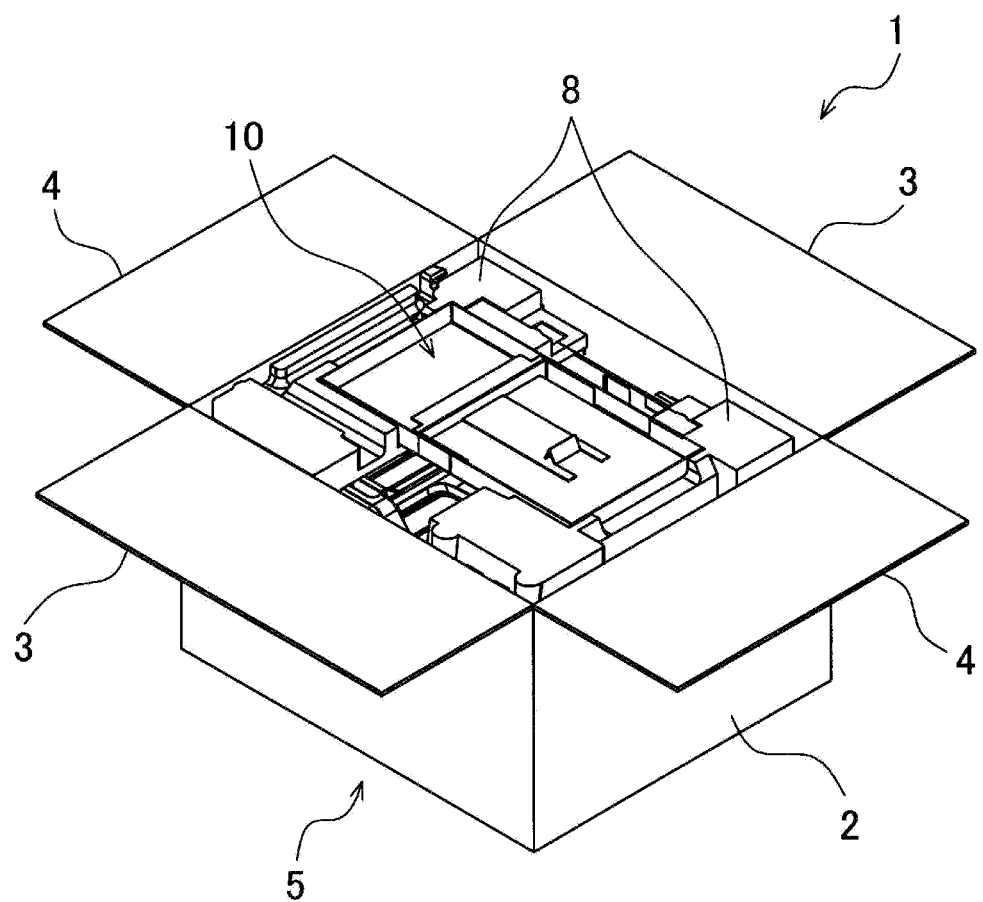
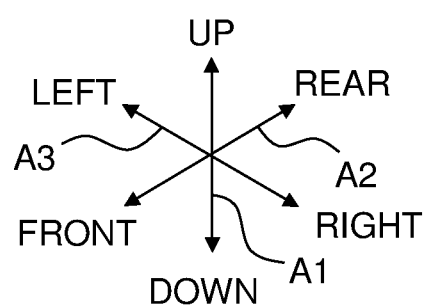

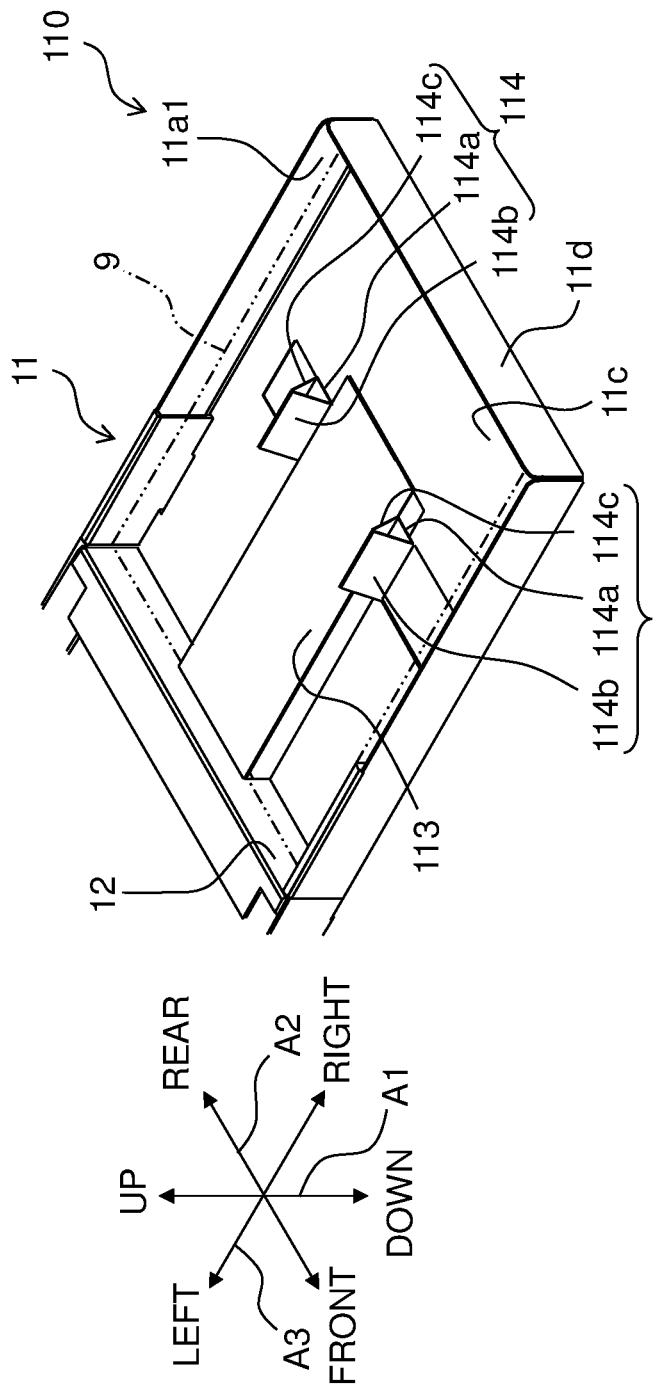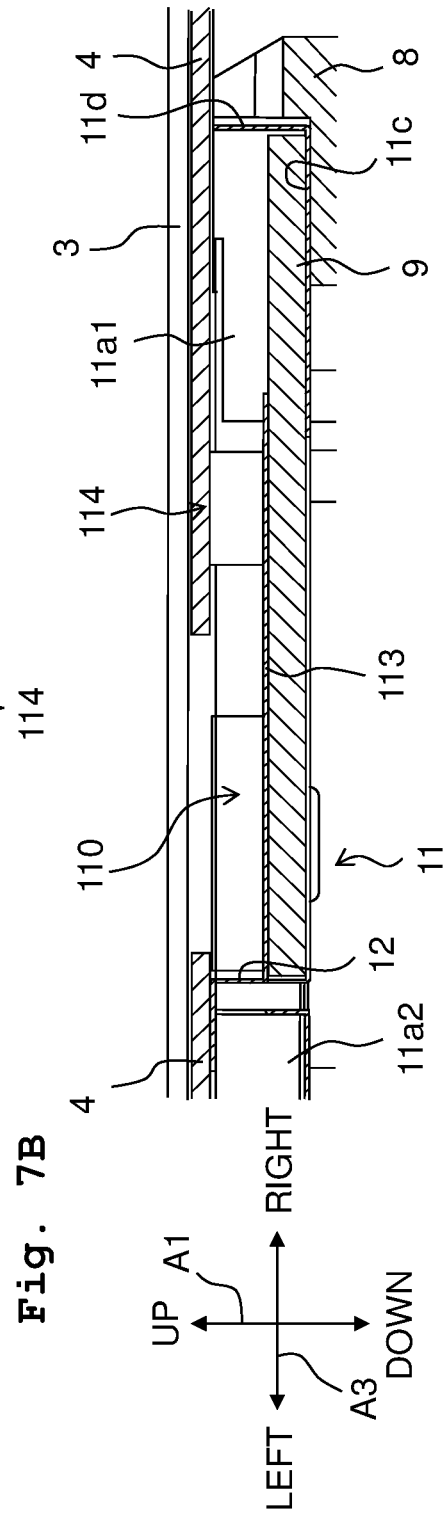

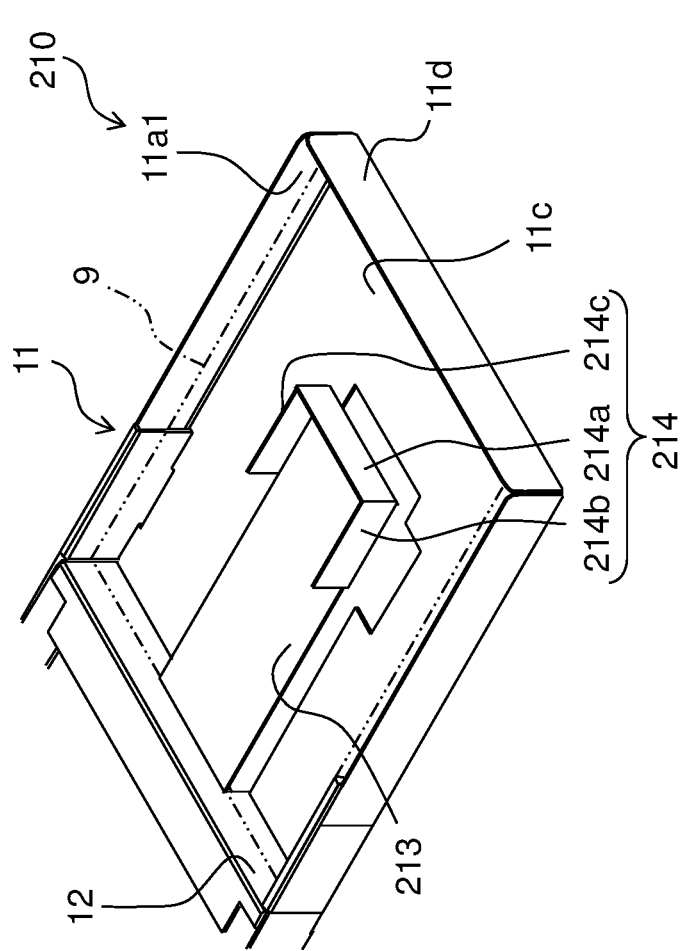
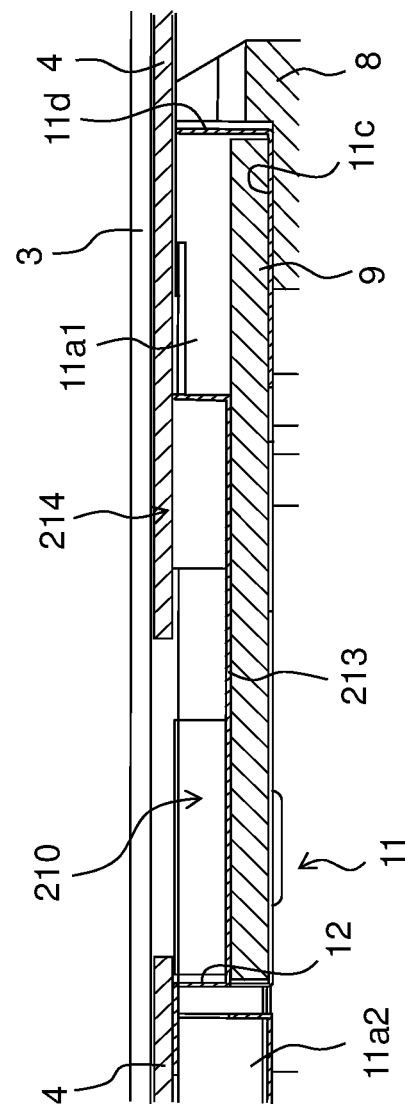
Fig. 8A
Fig. 8B

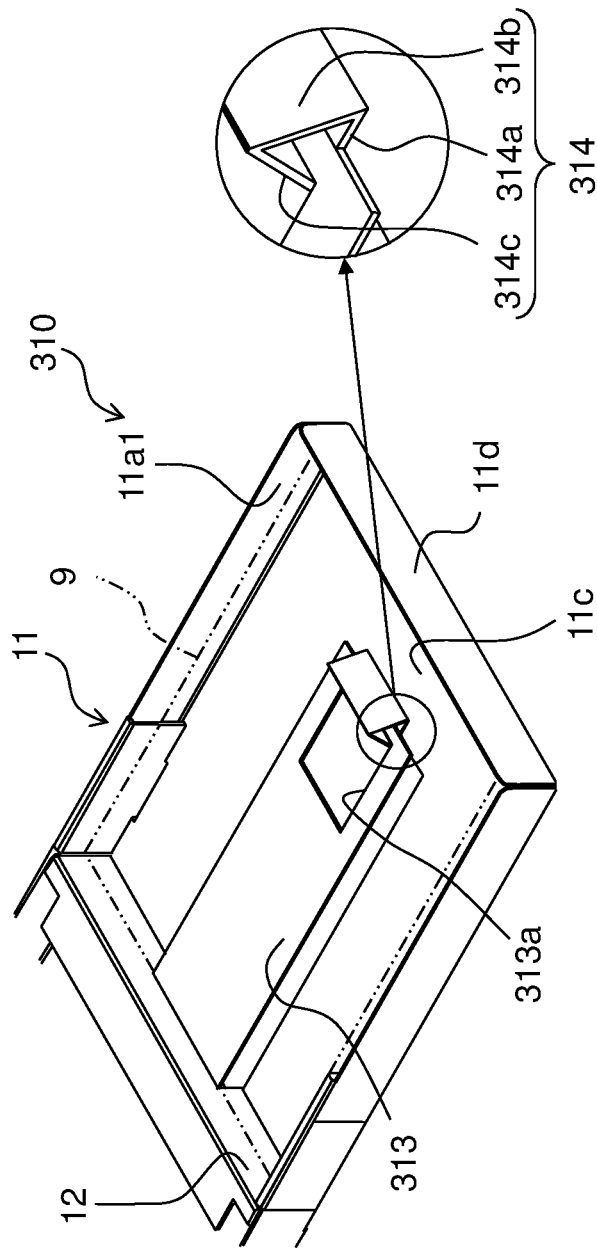
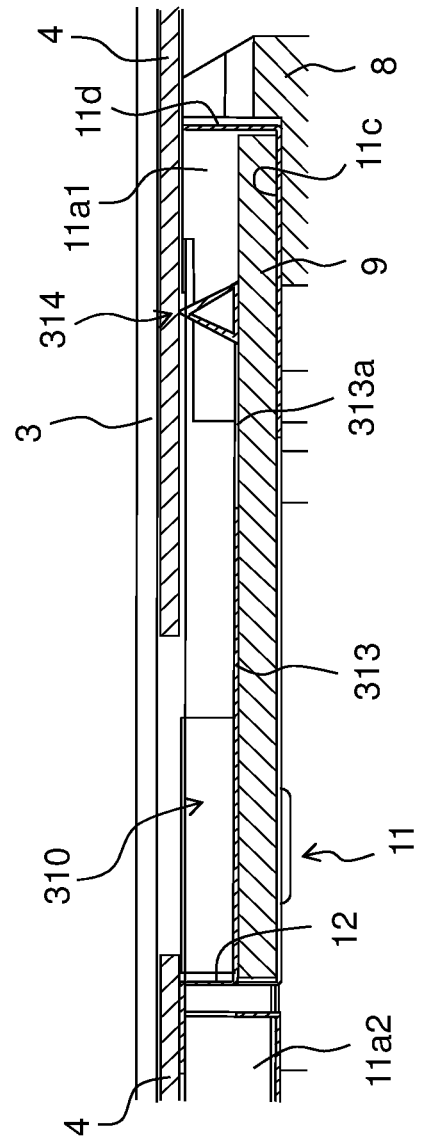
Fig. 9A
Fig. 9B

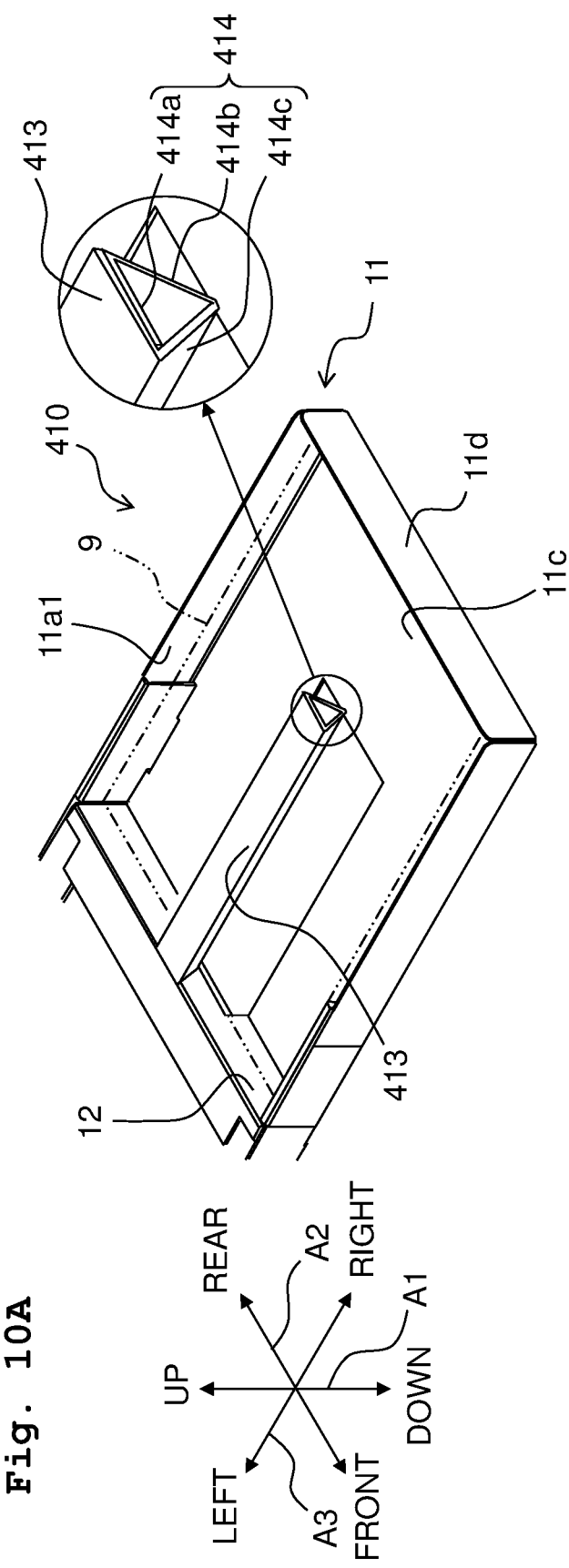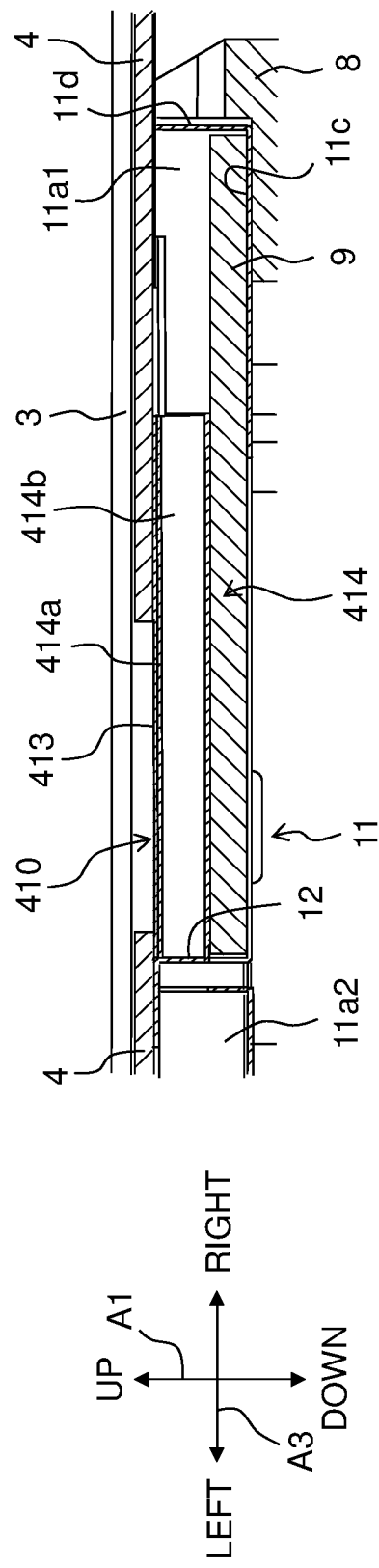
Fig. 10A
Fig. 10B

PACKAGING APPARATUS AND INNER BOX THEREOF

CROSS REFERENCE TO RELATED APPLICATION

The present application claims priority from Japanese Patent Application No. 2019-062396 filed on Mar. 28, 2019, the disclosure of which is incorporated herein by reference in its entirety.

BACKGROUND

Field of the Invention

The present disclosure relates to a packaging apparatus including: an inner box that is capable of storing or housing a first object; and an outer box that is capable of storing or housing the inner box and a second object, and relates to the inner box.

Description of the Related Art

Japanese Patent Application Laid-open No. 2014-223920 discloses a protective material that is used in a box including a pair of outer lids and a pair of inner lids. The protective material is formed in at least one lid included in the pair of outer lids or at least one lid included in the pair of inner lids. When unpacking is performed by cutting an adhesive tape adhering to a facing portion of the pair of outer lids with an edged tool, the protective material inhibits the edged tool from damaging a content (first object).

SUMMARY

However, the protective material described in Japanese Patent Application Laid-open No. 2014-223920 is only configured to be disposed between the content and the facing portion of the pair of outer lids. Thus, when the content moves due to vibration during transportation, the content may enter between the protective material and the facing portion of the pair of outer lids. In that case, when unpacking is performed by cutting the adhesive tape with the edged tool as described above, the cutting edge may contact with the content, which may damage the content.

An object of the present disclosure is to provide a packing apparatus that is capable of inhibiting damage to a first object, and an inner box thereof.

According to the first aspect of the present disclosure, there is provided a packaging apparatus, including: an inner box of which upper side is open and capable of storing a first object; an outer box capable of storing a second object and the inner box disposed on the second object, and the outer box having a pair of inner flaps and a pair of outer flaps; a protective portion formed in the inner box and configured to protect the first object, the protective portion being disposed between the first object and a portion that is included in a facing portion of the pair of outer flaps and that does not overlap with the pair of inner flaps in a state where the pair of inner flaps and the pair of outer flaps are closed, and a pressing portion formed in at least any one of the inner box and the outer box and configured to press the first object toward a bottom surface of the inner box, the pressing portion being disposed between the first object and a portion of the packaging apparatus other than the pressing portion in the state where the pair of inner flaps and the pair of outer flaps are closed.

According to the second aspect of the present disclosure, there is provided an inner box of which upper side is open, capable of storing a first object, and stored in a packaging apparatus, the packaging apparatus including an outer box that is capable of storing a second object and the inner box disposed on the second object and that is provided with a pair of inner flaps and a pair of outer flaps, the inner box comprising: a protective portion configured to protect the first object; and a pressing portion configured to press the first object toward a bottom surface of the inner box, wherein the protective portion is disposed between the first object and a portion that is included in a facing portion of the pair of outer flaps and that does not overlap with the pair of inner flaps, in a state where the pair of inner flaps and the pair of outer flaps are closed, and the protective portion is positioned between the first object and a portion of the packaging apparatus other than the pressing portion.

According to the packaging apparatus and the inner box of the present disclosure, the movement of the first object is regulated by the pressing portion. The first object is thus not likely to enter between the protective portion and the portion that is included in the facing portion of the pair of outer flaps and that does not overlap with the pair of inner flaps, during transportation. As a result, when the packaging apparatus in which the facing portion of the pair of outer flaps is sealed with an adhesive tape is unpacked, the first object is not likely to be damaged by an edged tool, for example, even when a user cuts the adhesive tape with the edged tool.

BRIEF DESCRIPTION OF THE DRAWINGS

FIG. 1 is a perspective view of a cardboard box according to an embodiment of the present disclosure.

FIG. 2 is a perspective view depicting a state where a pair of outer flaps and a pair of inner flaps provided for an upper portion of the cardboard box depicted in FIG. 1 are open.

FIGS. 7A and 7B each depict an inner box according to the first modified example of the present disclosure, wherein FIG. 7A is a perspective view of a main part thereof and FIG. 7B is a cross-sectional view of the main part of the inner box disposed in the cardboard box.

FIGS. 8A and 8B each depict an inner box according to the second modified example of the present disclosure, wherein FIG. 8A is a perspective view of a main part thereof and FIG. 8B is a cross-sectional view of the main part of the inner box disposed in the cardboard box.

FIGS. 9A and 9B each depict an inner box according to the third modified example of the present disclosure, wherein FIG. 9A is a perspective view of a main part thereof and FIG. 9B is a cross-sectional view of the main part of the inner box disposed in the cardboard box.

FIGS. 10A and 10B each depict an inner box according to the fourth modified example of the present disclosure, wherein FIG. 10A is a perspective view of a main part thereof and FIG. 10B is a cross-sectional view of the main part of the inner box disposed in the cardboard box.

DESCRIPTION OF THE EMBODIMENTS

A cardboard box 1 as a packaging apparatus according to an embodiment of the present disclosure is described below.

Figure 3:
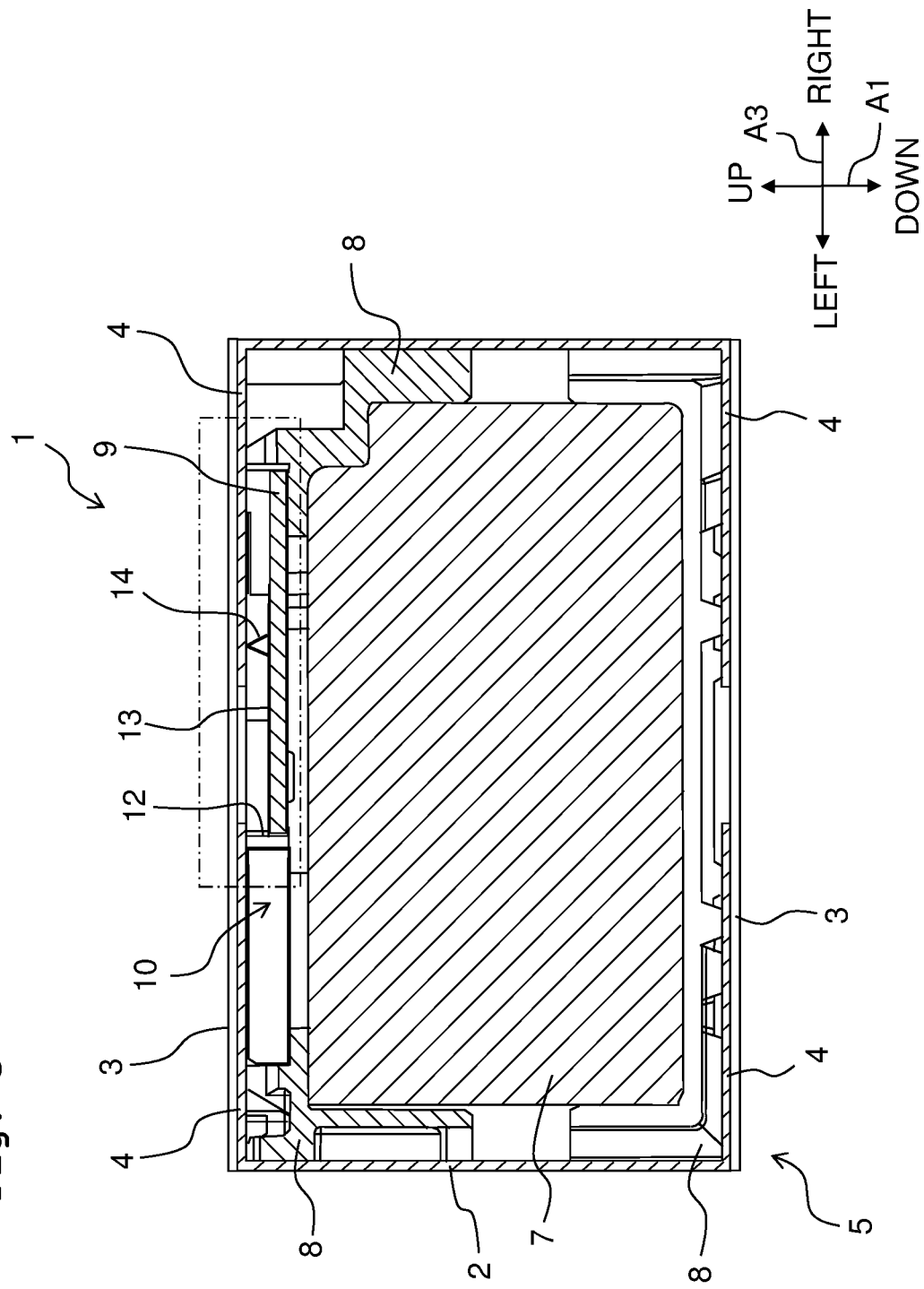
FIG. 3 is a view taken along an arrow in FIG. 1.

In this embodiment, three directions indicated by arrows in FIG. 1 are an up-down direction A1, a front-rear direction A2, and a left-right direction A3. The cardboard box 1 is explained using these directions. The three directions indicated in FIG. 1 are applicable to other figures or drawings. As depicted in FIGS. 1 and 2, the cardboard box 1 includes a JIS A-type outer box 5 and an inner box 10 (see FIG. 2) stored in the outer box 5. As depicted in FIGS. 2 and 3, the cardboard box 1 accommodates or contains a substantially rectangular parallelepiped shaped printer 7 (second object) for recording an image on a sheet, buffer materials 8 disposed between the printer 7 and the outer box 5, and accessories 9 (first object) disposed in the inner box 10. The accessories 9 in this embodiment are, for example, a manual of the printer 7, a compact disk (CD) storing driver software, a plastic bag for storing the manual, CD, and the like. The present disclosure, however, is not limited thereto. The buffer materials 8 are made from styrene foam, however, may be made from any other material.

Although the outer box 5 and the inner box 10 are made from cardboard, they may be made from any other paper than the cardboard. The outer box 5 and the inner box 10 may be made from any other material than paper. As depicted in FIGS. 1 and 2, the outer box 5 includes a rectangular cylindrical body 2, a pair of outer flaps 3 provided at upper and lower ends of the body 2, and a pair of inner flaps 4 provided at the upper and lower ends of the body 2. The outer box 5 has a rectangular parallelepiped shape that is long in the left-right direction A3, in a state where the pair of outer flaps 3 and the pair of inner flaps 4 are closed.

As depicted in FIG. 2, the body 2 has a rectangular cylindrical shape extending in the up-down direction A1. As depicted in FIGS. 1 and 2, the pair of outer flaps 3 are arranged at front and rear ends of the body 2. The pair of inner flaps 4 are arranged at left and right ends of the body 2. As depicted in FIG. 1, the cardboard box 1 is configured so that edges of the pair of outer flaps 3 face each other and edges of the pair of inner flaps 4 are separated from each other, when the cardboard box 1 is closed.

Figure 5:
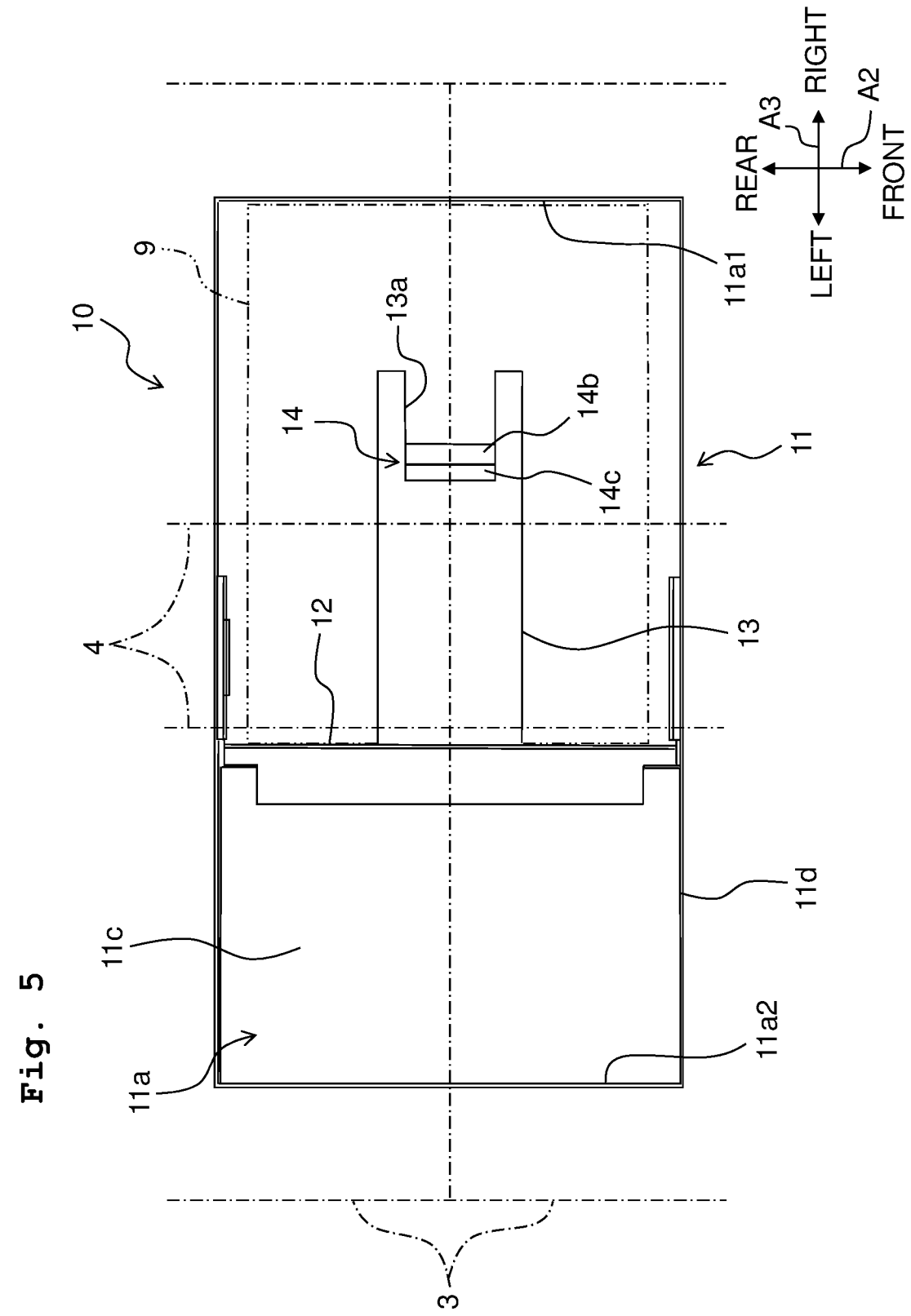
FIG. 5 is a plan view of an inner box depicted in FIG. 2.
Figure 6:
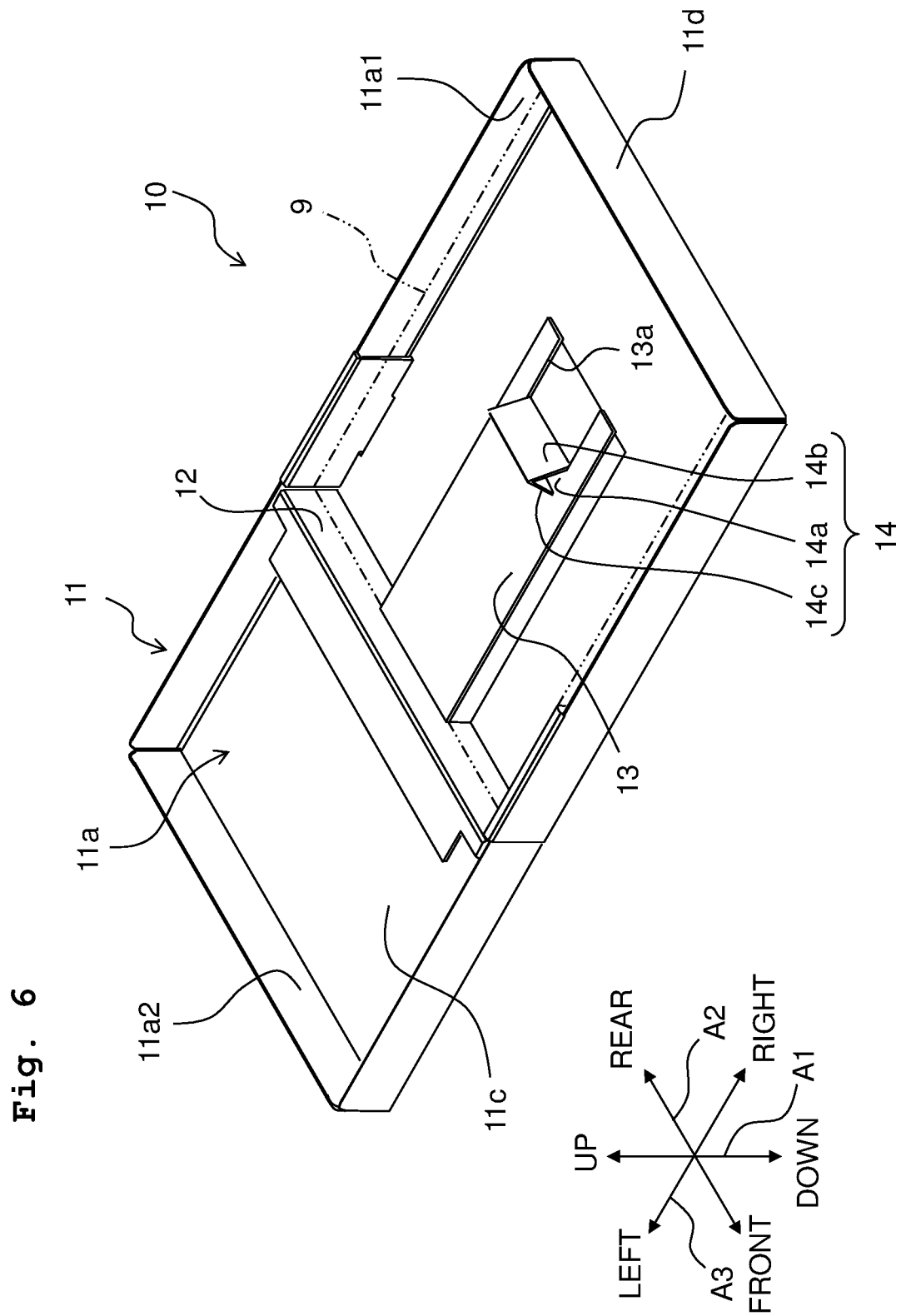
FIG. 6 is a perspective view of the inner box depicted in FIG. 2.

As depicted in FIGS. 2 and 3, the inner box 10 is stored in the outer box 5 such that the inner box 10 is supported from below by the buffer members 8 disposed at upper corners of the printer 7. As depicted in FIGS. 5 and 6, the inner box 10 includes a tray-like inner box body 11 of which upper side is open, a partition wall 12 partitioning an inner area 11a of the inner box body 11 into a right area 11a1 and a left area 11a2, a protective portion 13 protecting the accessories 9, and a pressing portion 14. The partition wall 12 stands upward from a bottom surface 11c of the inner box body 11 at a position closer to the left from a center portion in the left-right direction A3 of the inner box body 11. The partition wall 12 extends along an entire length in the front-rear direction A2 of the inner box body 11. The height of the partition wall 12 from the bottom surface 11c is the same as that of a circumferential wall 11d of the inner box body 11.

Figure 4:
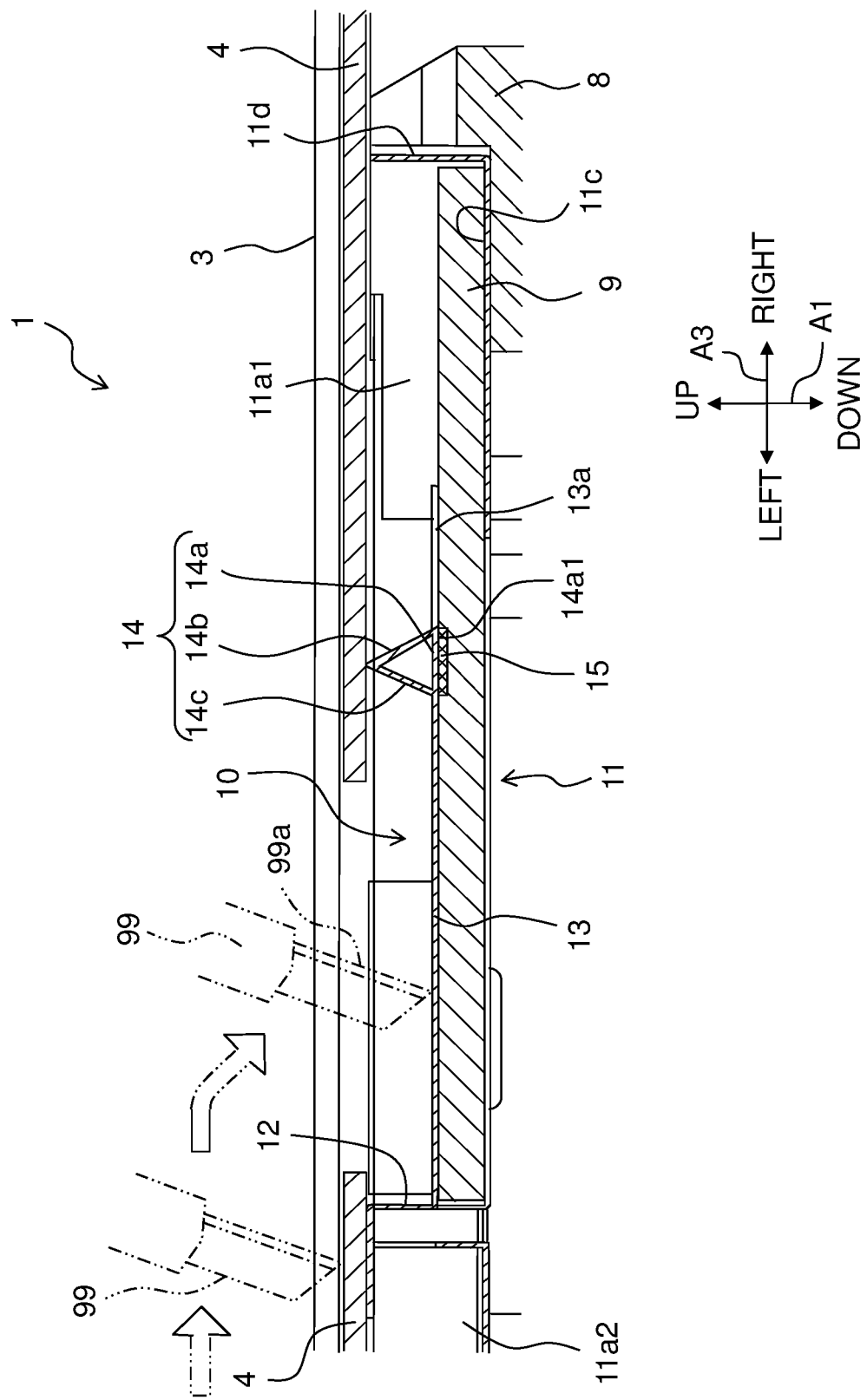
FIG. 4 is an enlarged view of a portion surrounded by a dot-dash chain line in FIG. 3.

As depicted in FIGS. 4 and 6, the protective portion 13 has a flat plate shape. The protective portion 13 extends rightward from a center portion in the up-down direction A1 of the partition wall 12. As depicted in FIG. 6, the protective portion 13 is formed by cutting part of the partition wall 12 and part of a bottom portion of the inner box body 11. As depicted in FIG. 5, the protective portion 13 has a substantially rectangular shape in plan view. The protective portion 13 is long in the left-right direction A3 and includes a notch 13a at a right end thereof as depicted in FIG. 5. As depicted in FIG. 4, the partition wall 12 is disposed below a left inner flap 4 in a state where the pair of inner flaps 4 is closed. The right end of the protective portion 13 is disposed below a right inner flap 4 in the state where the pair of inner flaps 4 is closed. The notch 13a of the protective portion 13 is disposed below the right inner flap 4 in the state where the pair of inner flaps 4 is closed. As depicted in FIGS. 4 and 5, the protective portion 13 is disposed between the accessories 9 and an entire portion that is included in the facing portion of the pair of outer flaps 3 and that does not overlap in the up-down direction A1 with the pair of inner flaps 4, in the state where the pair of outer flaps 3 and the pair of inner flaps 4 are closed. For example, when the cardboard box 1 of which facing portion of the pair of outer flaps 3 is sealed with an adhesive tape is unpacked by cutting the adhesive tape, specifically, by moving a cutter knife (edge tool) 99 from the left to the right while sticking an edge 99a of the cutter knife 99 in the facing portion of the pair of outer flaps 3, the protective portion 13 inhibits the edge 99a from contacting with the accessories 9 even when the edge 99a enters between the pair of inner flaps 4. Accordingly, damage to the accessories 9 by the cutter knife 99 can be inhibited.

As depicted in FIG. 6, the pressing portion 14 is formed by cutting part of the protective portion 13 corresponding to the notch 13a and bending the cut part into a triangle shape. Namely, the pressing portion 14 is formed integrally with the protective portion 13. As depicted in FIGS. 4 and 6, the pressing portion 14 has a horizontal portion 14a and two inclined portions 14b and 14c that are inclined to the horizontal portion 14a. The pressing portion 14 is formed into a triangular cylindrical shape extending in the front-rear direction A2. As depicted in FIGS. 4 and 5, the pressing portion 14 is disposed at a portion which is between the accessories 9 and the right inner flap 4 in the up-down direction A1 and which is a center of the inner box 10 in the front-rear direction A2. As depicted in FIG. 5, the pressing portion 14 is disposed to overlap in the up-down direction A1 with the facing portion of the pair of outer flaps 3 in the closed state. As depicted in FIG. 4, an upper end of the pressing portion 14 is brought into contact with the pair of inner flaps 4 in the state where the pair of outer flaps 3 and the pair of inner flaps 4 are closed. More specifically, the upper end of the pressing portion 14 is disposed at a position where the pressing portion 14 can obtain downward pressing force from the pair of inner flaps 4 in a state where the upper end of the pressing portion 14 is in contact with the pair of inner flaps 4 by closing the pair of outer flaps 3 and the pair of inner flaps 4. In this configuration, the pressing portion 14 is capable of pressing the accessories 9, which are stored in the right area 11a1 of the inner box 10 and are disposed below the protective portion 13, from above toward the bottom surface 11c of the inner box 10.

A lower surface 14a1 of the horizontal portion 14a of the pressing portion 14 is provided with a rubber sheet (high friction member) 15. The sheet 15 of this embodiment is made from rubber, however, may be made from any other material provided that the material has a higher friction coefficient than the lower surface 14a. The sheet 15 is brought into contact with the accessories 9 to apply pressing force from the pressing portion 14 to the accessories 9 in the state where the pair of outer flaps 3 and the pair of inner flaps 4 are closed.

As described above, in the cardboard box 1 of this embodiment, the movement of the accessories 9 (first object) is regulated by being pressed by the pressing portion 14. In this configuration, during transportation, the accessories 9 are not likely to enter between the protective portion 13 and the portion that is included in the facing portion of the pair of outer flaps 3 and that does not overlap in the up-down direction A1 with the pair of inner flaps 4. Thus, for example, when a user cuts the adhesive tape with the cutter knife 99 (edged tool) to unpack the cardboard box 1 (packing apparatus) in which the facing portion of the pair of outer flaps 3 is sealed with the adhesive tape, the accessories 9 are not likely to be damaged by the edge 99a.

The pressing portion 14 is formed by bending part of the protective portion 13 that is part of the inner box 10. Accordingly, the pressing portion 14 is formed relatively easy.

The upper end of the pressing portion 14 is brought into contact with the pair of inner flaps 4 in the state where the pair of inner flaps 4 and the pair of outer flaps 3 are closed. This results in the pressing force applied from the pressing portion 14 to the accessories 9.

The pressing portion 14 is disposed at the center portion in the front-rear direction (width direction) A2 of the inner box 10. This configuration allows the pressing portion 14 to press the center portion of the accessories 9 more reliably than a configuration in which the pressing portion 14 is disposed at one end in the front-rear direction A2 of the inner box 10. This reliably inhibits the movement of the accessories 9 during transportation.

The pressing portion 14 is integrally coupled to the protective portion 13. The sheet 15 as the high friction member is attached to the lower surface 14a1 of the pressing portion 14 (a surface facing the bottom surface 11c of the inner box 10). This reliably inhibits the movement of the accessories 9 during transportation.

Referring to FIGS. 7 to 10, the first to fourth modified examples of the inner box 10 are explained below. As depicted in FIG. 7, an inner box 110 according to the first modified example has substantially the same configuration as the inner box 10 of the above embodiment, except that a protective portion 113 and two pressing portions 114 are different from the protective portion 13 and the pressing portion 14 of the above embodiment. Thus, the constitutive parts or components, which are the same as or equivalent to those of the embodiment described above, are designated by the same reference numerals, any explanation therefor is omitted.

As depicted in FIG. 7, the protective portion 113 has a flat plate shape. The protective portion 113 extends rightward from a center portion in the up-down direction A1 of the partition wall 12. The protective portion 113 is formed by cutting part of the partition wall 12 and part of a bottom portion of the inner box body 11. The protective portion 113, which has a rectangular shape in plan view, is long in the left-right direction A3. A right end of the protective portion 113 is disposed below the right inner flap 4 in the state where the pair of inner flaps 4 is closed. The protective portion 113 is disposed between the accessories 9 and an entire portion that is included in the facing portion of the pair of outer flaps 3 and that does not overlap in the up-down direction A1 with the pair of inner flaps 4, in the state where the pair of outer flaps 3 and the pair of inner flaps 4 are closed. Thus, similar to the protective portion 13, when the cardboard box 1 sealed with the adhesive tape is unpacked by cutting the adhesive tape with the cutter knife 99, the protective portion 113 inhibits the edge 99a from contacting with the accessories 9 even when the edge 99a enters between the pair of inner flaps 4. Accordingly, damage to the accessories 9 by the cutter knife 99 can be inhibited.

The pressing portions 114 are formed at a front end and a rear end of the protective portion 113 in the front-rear direction A2. As depicted in FIG. 7A, similar to the protective portion 113, each pressing portion 114 is formed by a cut part of the bottom portion of the inner box body 11. The pressing portions 114 are formed integrally with the protective portion 113. Each pressing portion 114 is formed by bending the cut part into a triangle shape. As depicted in FIG. 7A, each pressing portion 114 includes a horizontal portion 114a and two inclined portions 114b and 114c inclined to the horizontal portion 114a. Each pressing portion 114 is formed into a triangular cylindrical shape extending in the left-right direction A3. As depicted in FIGS. 7A and 7B, the pressing portions 114 are disposed between the accessories 9 and the right inner flap 4 in the up-down direction A1 at both sides in the front-rear direction A2 with a center portion of the inner box 110 interposed therebetween. In the state where the pair of outer flaps 3 is closed, the pressing portion 114 disposed at the front side overlaps in the up-down direction A1 with a front outer flap 3 and the pressing portion 114 disposed at the rear side overlaps in the up-down direction A1 with a rear outer flap 3. Similar to the pressing portion 14, an upper end of each pressing portion 114 is brought into contact with the pair of inner flaps 4 and a lower end of each pressing portion 114 is brought into contact with the accessories 9 stored in the right area 11a1 in the state where the pair of outer flaps 3 and the pair of inner flaps 4 are closed. In this configuration, the pressing portions 114 are capable of pressing the accessories 9, which are stored in the right area 11a1 of the inner box 110 and are disposed below the protective portion 113, from above toward the bottom surface 11c of the inner box 110.

In the inner box 110 according to the first modified example, the movement of the accessories 9 is regulated by being pressed by the pressing portions 114. Thus, similar to the above embodiment, when a user cuts the adhesive tape with the cutter knife 99 (edged tool) to unpack the cardboard box (packing apparatus), the accessories 9 are not likely to be damaged by the edge 99a. The configuration similar to the above embodiment obtains the same effect.

As depicted in FIGS. 8A and 8B, an inner box 210 according to the second modified example has substantially the same configuration as the inner box 10 of the above embodiment, except that a protective portion 213 and a pressing portion 214 are different from the protective portion 13 and the pressing portion 14 of the above embodiment. Thus, the constitutive parts or components, which are the same as or equivalent to those of the embodiment described above, are designated by the same reference numerals, any explanation therefor is omitted. The protective portion 213 is similar to the protective portion 113.

As depicted in FIGS. 8A and 8B, the protective portion 214 is formed by cutting part of a bottom portion of the inner box body 11. The protective portion 214 is formed integrally with a right end of the protective portion 213. The pressing portion 214 is formed by bending the cut part so that the pressing portion 214 is vertical. Namely, the pressing portion 214 includes a first vertical portion 214a parallel to the front-rear direction A2, and two second vertical portions 214b and 214c parallel to the left-right direction A3. As depicted in FIGS. 8A and 8B, the pressing portion 214 is disposed between the accessories 9 and the right inner flap 4 in the up-down direction A1 at a center portion in the front-rear direction A2 of the inner box 210. Further, similar to the pressing portion 14, upper ends of the vertical portions 214a to 214c of the pressing portion 214 are brought into contact with the pair of inner flaps 4 in the state where the pair of outer flaps 3 and the pair of inner flaps 4 are closed. Further, lower ends of the vertical portions 214a to 214c of the pressing portion 214 are brought into contact with the accessories 9 stored in the right area 11a1. In this configuration, the pressing portion 214 is capable of pressing the accessories 9, which are stored in the right area 11a1 of the inner box 210 and disposed below the protective portion 213, from above toward the bottom surface 11c of the inner box 210.

In the inner box 210 according to the second modified example, the movement of the accessories 9 is regulated by being pressed by the pressing portion 214. Thus, similar to the above embodiment, when a user cuts the adhesive tape with the cutter knife 99 (edged tool) to unpack the cardboard box (packing apparatus), the accessories 9 are not likely to be damaged by the edge 99a. The configuration similar to the above embodiment obtains the same effect.

As depicted in FIGS. 9A and 9B, an inner box 310 according to the third modified example has substantially the same configuration as the inner box 10 of the above embodiment, except that a protective portion 313 and a pressing portion 314 are different from the protective portion 13 and the pressing portion 14 of the above embodiment. Thus, the constitutive parts or components, which are the same as or equivalent to those of the embodiment described above, are designated by the same reference numerals, any explanation therefor is omitted.

As depicted in FIGS. 9A and 9B, the protective portion 313 has a flat plate shape. The protective portion 313 extends rightward from a center portion in the up-down direction A1 of the partition wall 12. The protective portion 313 is formed by a cut part of the partition wall 12 and a cut part of a bottom portion of the inner box body 11. The protective portion 313 has a rectangular shape in plan view. The protective portion 313 is long in the left-right direction A3 and includes a notch 313a at a position between its center portion and its right end. The right end of the protective portion 313 is positioned below the right inner flap 4 in the state where the pair of inner flaps 4 is closed. Further, the notch 313a of the protective portion 313 is positioned below the right inner flap 4 in the state where the pair of inner flaps 4 is closed. The protective portion 313 is disposed between the accessories 9 and an entire portion that is included in the facing portion of the pair of outer flaps 3 and that does not overlap in the up-down direction A1 with the pair of inner flaps 4, in the state where the pair of outer flaps 3 and the pair of inner flaps 4 are closed. Thus, similar to the protective portion 13, when the cardboard box 1 sealed with the adhesive tape is unpacked by cutting the adhesive tape with the cutter knife 99, the protective portion 313 inhibits the edge 99a from contacting with the accessories 9 even when the edge 99a enters between the pair of inner flaps 4. Accordingly, damage to the accessories 9 by the cutter knife 99 can be inhibited.

As depicted in FIGS. 9A and 9B, the pressing portion 314 is formed by cutting part of the protective portion 313 corresponding to the notch 313a and bending the cut part into a triangle shape. Namely, the pressing portion 314 is formed integrally with the protective portion 313. The pressing portion 314 includes a horizontal portion 314a and two inclined portions 314b and 314c inclined to the horizontal portion 314a. The pressing portion 314 is formed into a triangular cylindrical shape extending in the front-rear direction A2. In the state where the pair of inner flaps 4 is closed, the pressing portion 314 is disposed between the accessories 9 and the right inner flap 4 in the up-down direction A1 at a center portion in the front-rear direction A2 of the inner box 310. The pressing portion 314 is disposed to overlap in the up-down direction A1 with the facing portion of the pair of outer flaps 3 in the closed state. An upper end of the pressing portion 314 is brought into contact with the pair of inner flaps 4 in the state where the pair of outer flaps 3 and the pair of inner flaps 4 are closed. Further, a lower end of the pressing portion 314 is brought into contact with the accessories 9 stored in the right area 11a1. In this configuration, the pressing portion 314 is capable of pressing the accessories 9, which are stored in the right area 11a1 of the inner box 310 and are disposed below the protective portion 313, from above toward the bottom surface 11c of the inner box 310.

In the inner box 310 according to the third modified example, the movement of the accessories 9 is regulated by being pressed by the pressing portion 314. Thus, similar to the above embodiment, when a user cuts the adhesive tape with the cutter knife 99 (edged tool) to unpack the cardboard box (packing apparatus), the accessories 9 are not likely to be damaged by the edge 99a. The configuration similar to the above embodiment obtains the same effect.

As depicted in FIGS. 10A and 10B, an inner box 410 according to the fourth modified example has substantially the same configuration as the inner box 10 of the above embodiment, except that a protective portion 413 and a pressing portion 414 are different from the protective portion 13 and the pressing portion 14 of the above embodiment. Thus, the constitutive parts or components, which are the same as or equivalent to those of the embodiment described above, are designated by the same reference numerals, any explanation therefor is omitted.

As depicted in FIGS. 10A and 10B, the protective portion 413 has a flat plate shape. The protective portion 413 is disposed to have substantially the same height as an upper end of the partition wall 12 in the up-down direction A1. The protective portion 413 is formed by a part of the partition wall 12 and a cut part of a bottom portion of the inner box body 11. Namely, a horizontal portion that is included in a triangle shape formed by bending the cut part and that is positioned uppermost functions as the protective portion 413. The protective portion 413, which has a rectangular shape in plan view, is long in the left-right direction A3. A right end of the protective portion 413 is disposed below the right inner flap 4 in the state where the pair of inner flaps 4 is closed. The protective portion 413 is disposed between the accessories 9 and an entire portion that is included in the facing portion of the pair of outer flaps 3 and that does not overlap in the up-down direction A1 with the pair of inner flaps 4, in the state where the pair of outer flaps 3 and the pair of inner flaps 4 are closed. Thus, similar to the protective portion 13, when the cardboard box 1 sealed with the adhesive tape is unpacked by cutting the adhesive tape with the cutter knife 99, the protective portion 413 inhibits the edge 99a from contacting with the accessories 9 even when the edge 99a enters between the pair of inner flaps 4. Accordingly, damage to the accessories 9 by the cutter knife 99 can be inhibited. The protective portion 413 is configured to come into contact with the pair of inner flaps 4 when the pair of outer flaps 3 and the pair of inner flaps 4 are closed.

As depicted in FIGS. 10A and 10B, the pressing portion 414 is formed by the part of the partition wall 12 and the cut part of a bottom portion of the inner box body 11. Namely, the pressing portion 414 is formed by any other portion than the horizontal portion (protective portion 413) that is the uppermost portion of the triangle shape formed by bending the cut part. The pressing portion 414 includes a horizontal portion 414a and two inclined portions 414b and 414c inclined to the horizontal portion 414a. The pressing portion 414 is formed into a triangular cylindrical shape extending in the left-right direction A3. Namely, the pressing portion 414 is formed integrally with the protective portion 413. The pressing portion 414 is disposed between the accessories 9 and the protective portion 413 in the up-down direction A1 at a center portion in the front-rear direction A2 of the inner box 410. The pressing portion 414 is disposed to overlap in the up-down direction A1 with the facing portion of the pair of outer flaps 3 in the closed state. The pressing portion 414 is brought into contact with the pair of inner flaps 4 via the protective portion 413 in the state where the pair of outer flaps 3 and the pair of inner flaps 4 are closed. A lower end of the pressing portion 414 comes into contact with the accessories 9 stored in the right area 11a1. In this configuration, the pressing portion 414 is capable of pressing the accessories 9, which are stored in the right area 11a1 of the inner box 410, from above toward the bottom surface 11c of the inner box 410.

In the inner box 410 according to the fourth modified example, the movement of the accessories 9 is regulated by being pressed by the pressing portion 414. Thus, similar to the above embodiment, when a user cuts the adhesive tape with the cutter knife 99 (edged tool) to unpack the cardboard box (packing apparatus), the accessories 9 are not likely to be damaged by the edge 99a. Further, when the pair of outer flaps 3 and the pair of inner flaps 4 are closed, the pressing portion 414 is brought into contact with the pair of inner flaps 4 via the protective portion 413. The pressing force applied from the pressing portion 414 to the accessories 9 can be thus obtained by coupling the protective portion 413 to an upper end (horizontal portion 414a) of the pressing portion 414. The configuration similar to the above embodiment obtains the same effect.

The embodiments of the present disclosure are explained above. The present disclosure, however, is not limited to the above. Various changes or modifications may be made without departing from the claims. For example, the upper ends of the pressing portions 14, 114, 214, and 314 according to the above embodiment and the first to third modified examples are brought into contact with the pair of inner flaps 4, in the state where the pair of outer flaps 3 and the pair of inner flaps 4 are closed. However, the upper ends may be brought into contact with any other portions of the cardboard box 1 than the pressing portions 14, 114, 214, and 314, such as the pair of outer flaps 3. The pressing portions 14, 114, 214, and 314 may be respectively disposed on the protective portions 13, 113, 213, and 313. Further, the high friction member may be attached to the lower surfaces of the pressing portions 114, 214, 314, and 414. The sheet 15 provided for the lower surface 14a of the pressing portion 14 is not indispensable.

The configuration of each of the pressing portion 14, 114, 214, 314, and 414 is not limited to the configuration formed by bending part of the inner box. Each of the pressing portion 14, 114, 214, 314, and 414 may not be coupled to the corresponding one of the protective portions 13, 113, 213, 313, and 413. Each of the pressing portion 14, 114, 214, 314, and 414 may be formed in the outer box 5. The outer box 5 may be any other rectangular shape than the rectangular parallelepiped shape that is long in the left-right direction A3.

The accessories 9 as the first object and the printer 7 as the second object are not limited thereto. The first and second objects may be any other objects.

What is claimed is:

1. A packaging apparatus, comprising:
    an inner box of which upper side is open and capable of storing a first object;
    an outer box capable of storing a second object and the inner box disposed on the second object, the outer box having a pair of inner flaps and a pair of outer flaps;
    a protective portion formed in the inner box and configured to protect the first object, the protective portion being disposed between the first object and a portion that is included in a facing portion of the pair of outer flaps and that does not overlap with the pair of inner flaps in a state where the pair of inner flaps and the pair of outer flaps are closed, and
    a pressing portion formed in at least any one of the inner box and the outer box and configured to press the first object toward a bottom surface of the inner box, the pressing portion being disposed between the first object and a portion of the packaging apparatus other than the pressing portion in the state where the pair of inner flaps and the pair of outer flaps are closed.

2. The packaging apparatus according to claim 1, wherein the pressing portion is configured by bending part of the inner box.

3. The packaging apparatus according to claim 1, wherein an upper end of the pressing portion is brought into contact with at least one of the pair of inner flaps in the state where the pair of inner flaps and the pair of outer flaps are closed.

4. The packaging apparatus according to claim 3,
    wherein the outer box has a rectangular parallelepiped shape that is long in one direction, and
    the pressing portion is disposed at a center portion of the inner box in a width direction orthogonal to the one direction.

5. The packaging apparatus according to claim 3,
    wherein the pressing portion is coupled with the protective portion, and
    a high friction member is provided for a surface of the pressing portion at a side of the bottom surface of the inner box, the high friction member having friction coefficient which is higher than that of the surface.

6. The packaging apparatus according to claim 1,
    wherein the protective portion is disposed at a lower side of the pair of outer flaps and the pair of inner flaps to be brought into contact with the pair of inner flaps, in the state where the pair of inner flaps and the pair of outer flaps are closed,
    an upper end of the pressing portion is coupled with the protective portion, and
    a lower end of the pressing portion is brought into contact with the first object.

7. An inner box of which upper side is open, capable of storing a first object, and stored in a packaging apparatus, the packaging apparatus including an outer box that is capable of storing a second object and the inner box disposed on the second object and that is provided with a pair of inner flaps and a pair of outer flaps, the inner box comprising:
    a protective portion configured to protect the first object; and
    a pressing portion configured to press the first object toward a bottom surface of the inner box,
    wherein the protective portion is disposed between the first object and a portion that is included in a facing portion of the pair of outer flaps and that does not overlap with the pair of inner flaps, in a state where the pair of inner flaps and the pair of outer flaps are closed, and the protective portion is positioned between the first object and a portion of the packaging apparatus other than the pressing portion.

* * * * *